May 22, 1956   P. E. GAIRE   2,746,347
SLIDE RULE MAGNIFIERS
Filed Nov. 24, 1953   5 Sheets-Sheet 1
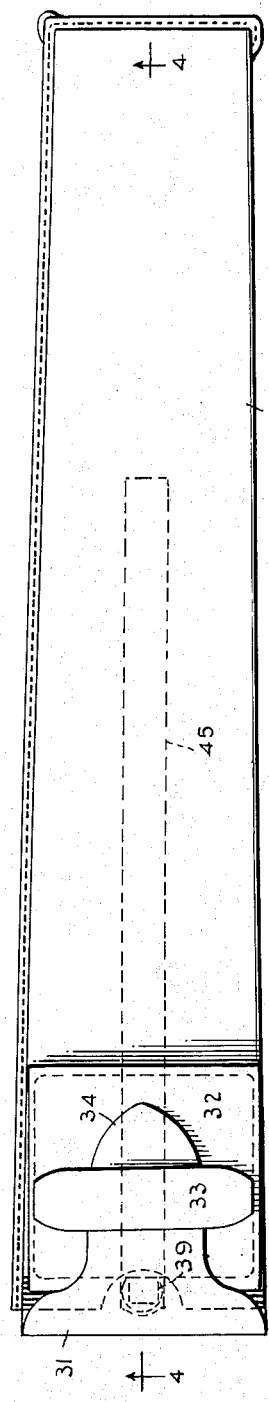
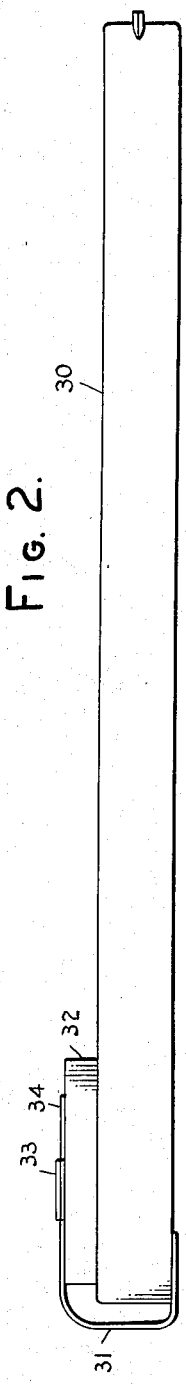
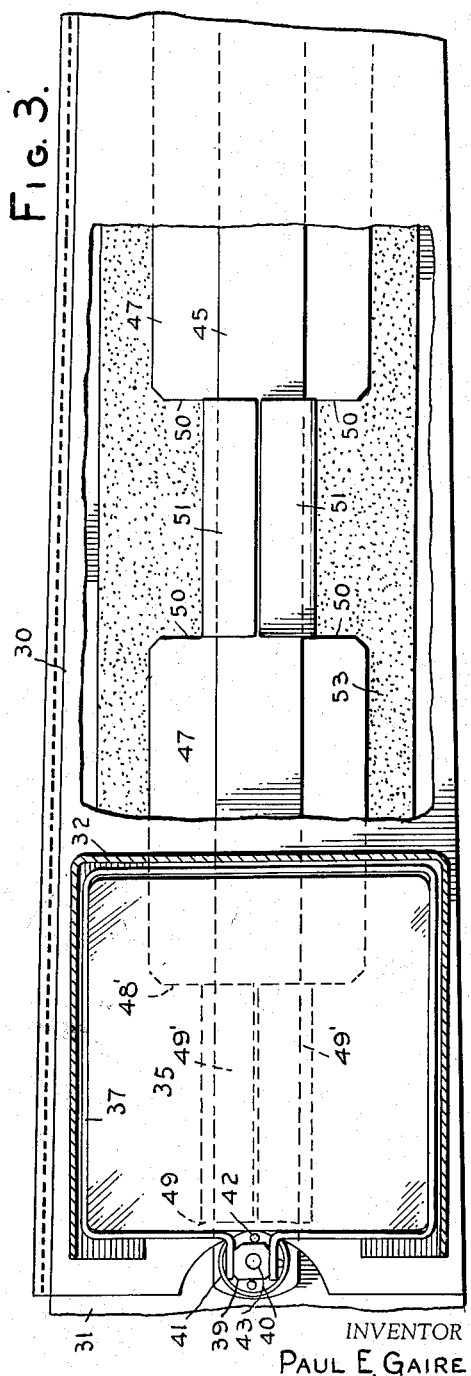
INVENTOR
PAUL E. GAIRE
BY May 22, 1956 P. E. GAIRE 2,746,347
SLIDE RULE MAGNIFIERS
Filed Nov. 24, 1953 5 Sheets-Sheet 2
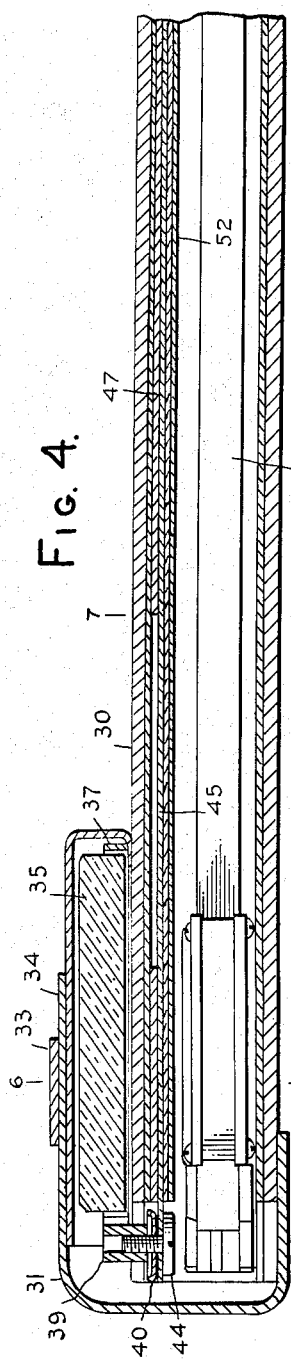
INVENTOR
PAUL E. GAIRE
BY May 22, 1956 P. E. GAIRE 2,746,347
SLIDE RULE MAGNIFIERS
Filed Nov. 24, 1953 5 Sheets-Sheet 3

INVENTOR
PAUL E. GAIRE

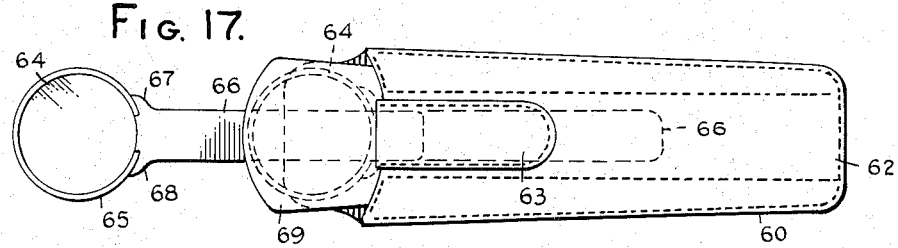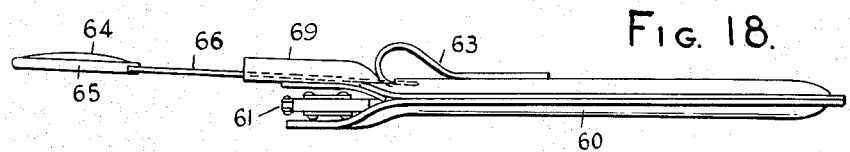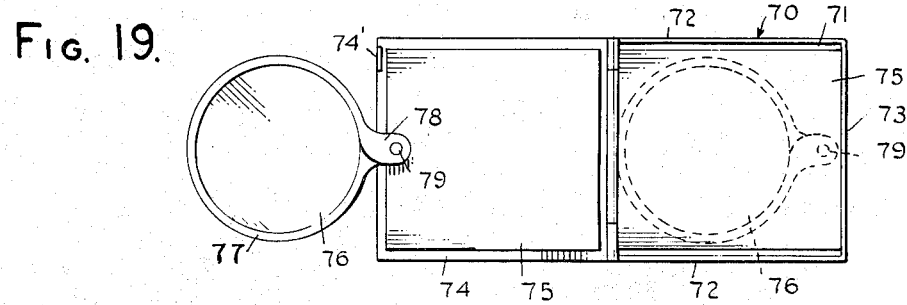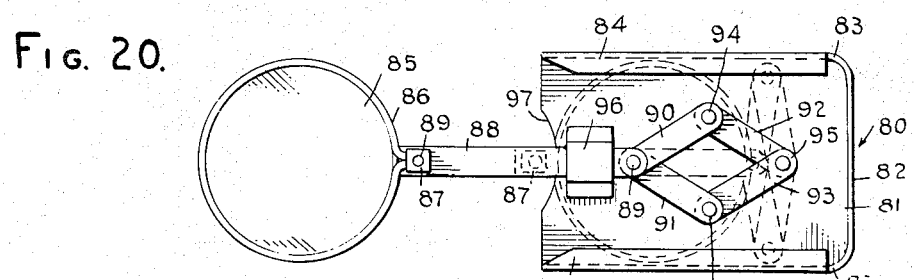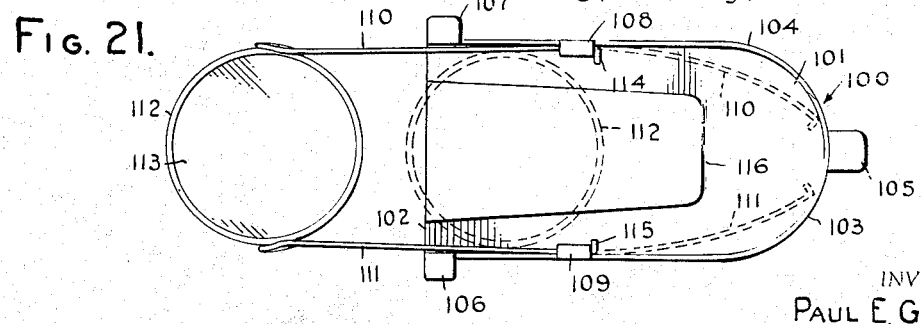

May 22, 1956 P. E. GAIRE 2,746,347
SLIDE RULE MAGNIFIERS
Filed Nov. 24, 1953 5 Sheets-Sheet 5
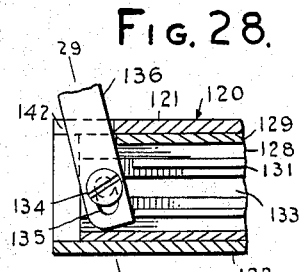
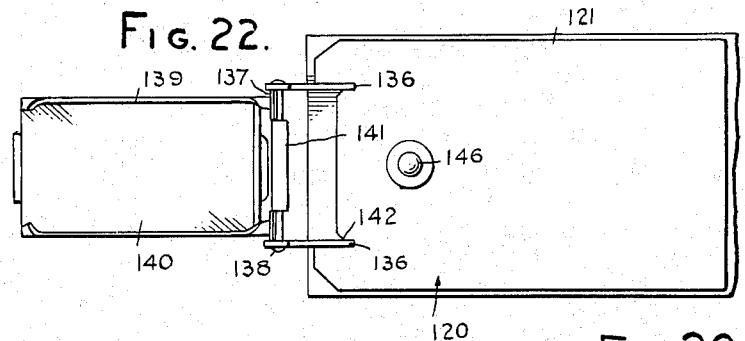
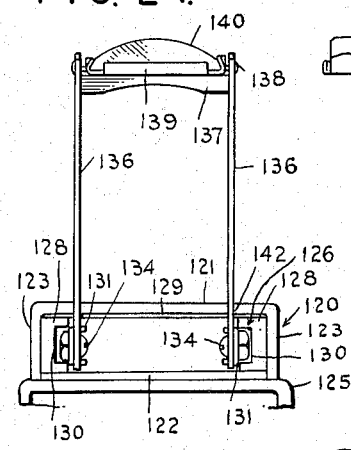
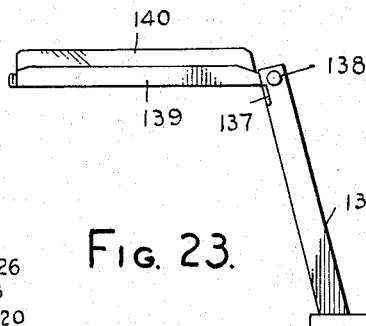
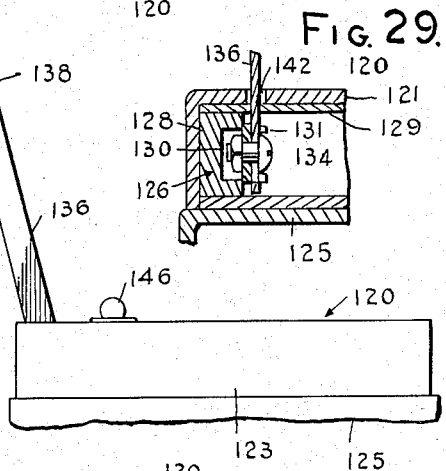
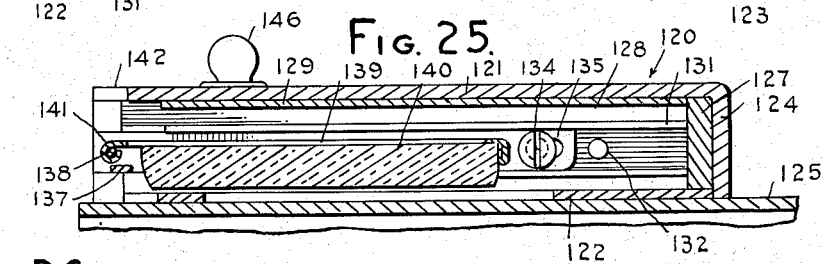
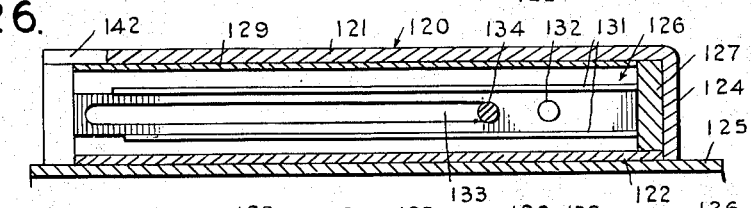
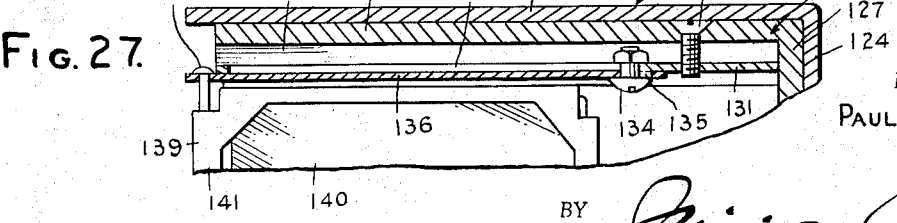
INVENTOR
PAUL E. GAIRE

United States Patent Office 2,746,347
Patented May 22, 1956

2,746,347

SLIDE RULE MAGNIFIERS

Paul E. Gaire, Midland Park, N. J.

Application November 24, 1953, Serial No. 394,085

2 Claims. (Cl. 88—39)

This invention relates to improvements in magnifiers and more especially to magnifiers that are adapted to be used in conjunction or cooperation with a slide rule.

It is a well-known fact that the indicia on slide rules is very minute and even a person with normal eyesight has difficulty in reading the same under good or especially bad lighting effects.

An object of the invention is therefore the provision of a magnifier that is adapted to be carried by the case usually housing a slide rule and so mounted thereon that it may be conveniently moved into position to enable the user of the slide rule to more readily read the indicia on the slide rule.

Another object of the invention is to provide a case or housing for the magnifier that can be easily attached to the case for the slide rule to provide a handy compact article that can be as easily handled as the case could be were the case for the magnifier not mounted thereon.

Since there are many and varied ways in which the magnifier could be mounted on the case for the slide rule, this invention includes preferred, as well as modified, embodiments of the invention.

Another object of the invention is to provide a combination case that will provide compartments for housing a magnifier and for housing a slide rule and the case being of such light weight that it is not bulky and is easily transported.

Another object of the invention is to provide a case that will counterbalance the magnifier and hold it in position over the slide rule so that the slide rule may be operated with both hands.

The user of the slide rule does not therefore have to hold the magnifier with one hand while he is using the slide rule, as such a magnifier that would require one hand to hold the same would not provide an efficient addition or provide an efficient arrangement for using the slide rule.

With these and other objects and advantages in view the invention consists in certain novel features of construction, combination and arrangement of parts to be hereinafter more fully described and claimed.

For a complete understanding of the invention reference is to be had to the following description and accompany drawings in which:

Fig. 1 is a plan view of a case for a slide rule showing one embodiment of the invention used in conjunction therewith;

Fig. 2 is a side elevational view of Fig. 1;

Fig. 3 is an enlarged detailed view partly in section and partly broken away showing the magnifier and the mounting therefor as it is positioned in the casing for the slide rule;

Fig. 4 is a longitudinal sectional view on the line 4—4 of Fig. 1;

Fig. 5 is an end view of the casings for the slide rule and magnifier with the flap therefor shown in section;

Fig. 6 is a vertical sectional view on the line 6—6 of Fig. 4;

Fig. 7 is another vertical sectional view on the line 7—7 of Fig. 4;

Fig. 8 is a fragmentary detailed view of one one of the support for the magnifier;

Fig. 9 is a detailed vertical sectional view showing the manner in which the frame for the magnifier is attached to the support therefor;

Fig. 10 is a similar view showing the frame for the magnifier moved 90 degrees from the position as shown in Fig. 9;

Fig. 11 is a detailed bottom plan view of the clamping washer for the frame showing the depressions therein whereby the frame is adjusted in relation to the support;

Fig. 12 is a detailed fragmentary plan view of the clamping washer of Fig. 11 and the nut secured thereto;

Fig. 17 is a plan view of a modified form of the invention;

Fig. 18 is a side elevational view of Fig. 17;

Fig. 19 is a plan view of another modified form of the invention showing in full the position of the magnifier in use and in dotted lines when not in use;

Fig. 20 is a plan view of another modified form of the invention;

Fig. 21 is a plan view of a further modified form of the invention;

Fig. 22 is a plan view of a still further modified form of the invention with the magnifier in position to read the indicia on a slide rule.

Fig. 23 is a side elevational view of the form of the invention shown in Fig. 22;

Fig. 24 is a front elevational view of the form of the invention shown in Fig. 22;

Fig. 25 is a longitudinal sectional view of the form shown in Fig. 22 as it is positioned in the case therefor;

Fig. 26 is another longitudinal sectional view on a line moved inwardly of the line on which the section of Fig. 25 was taken;

Fig. 27 is a detailed fragmentary sectional view on the line 27—27 of Fig. 25;

Fig. 28 is a detailed fragmentary view of the pivotal support for the frame of the magnifier of Fig. 22; and Fig. 29 is a detailed fragmentary sectional view on the line 29—29 of Fig. 28.

Figure 13:
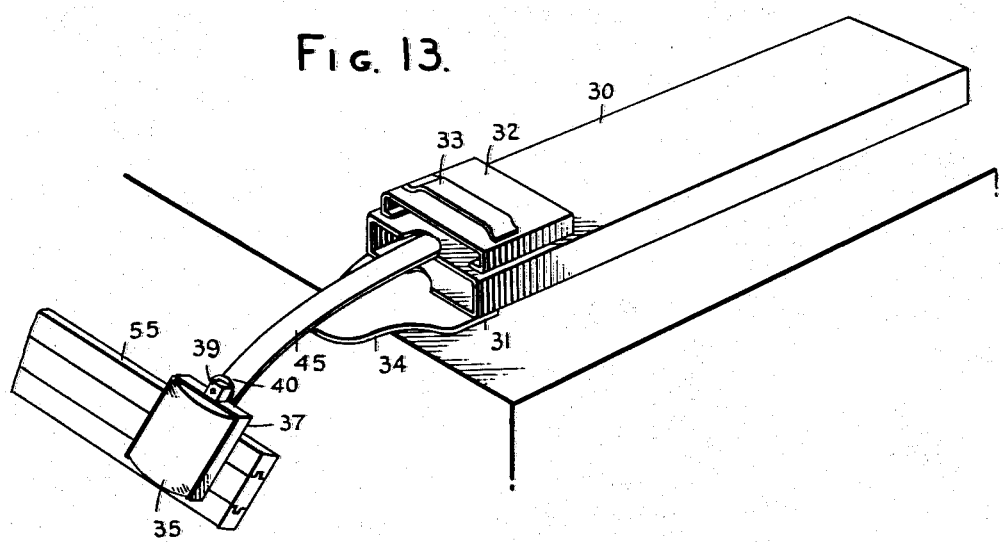
Fig. 13 is a perspective view of the preferred embodiment of the invention in use with the slide rule.

Referring more in detail to the drawings wherein like parts are designated by like reference numerals, the numeral 30 designates a carrying case that is usually provided for housing a conventional slide rule. The case 30 being of conventional character is provided with the usual flap 31 that closes the opening end of the case to retain the slide rule therein.

The invention contemplates a magnifier for the slide rule and the same may be housed in an auxiliary casing 32 which may be secured to the casing 30 in any approved manner.

A retaining loop 33 is usually provided to receive a reduced end 34 of the flap 31 and in the form of the invention to be later described the loop 33 is secured to the surface of the casing 32 in any approved manner.

Figure 14:
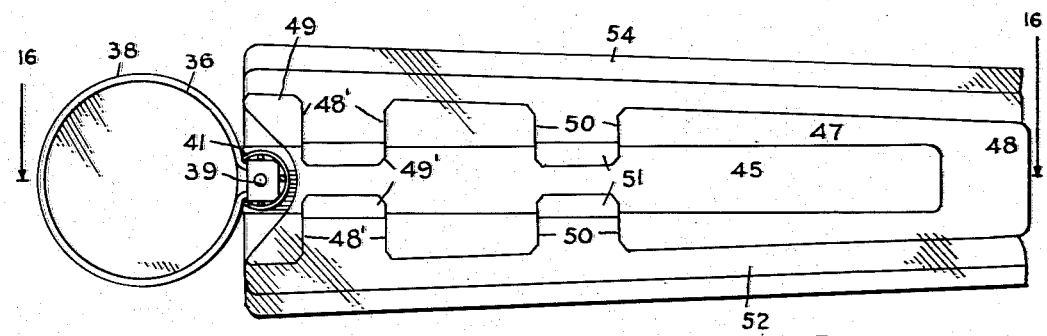
Fig. 14 is a top plan view of the keeper for the support for the magnifier with the protective cover in place.
Figure 15:
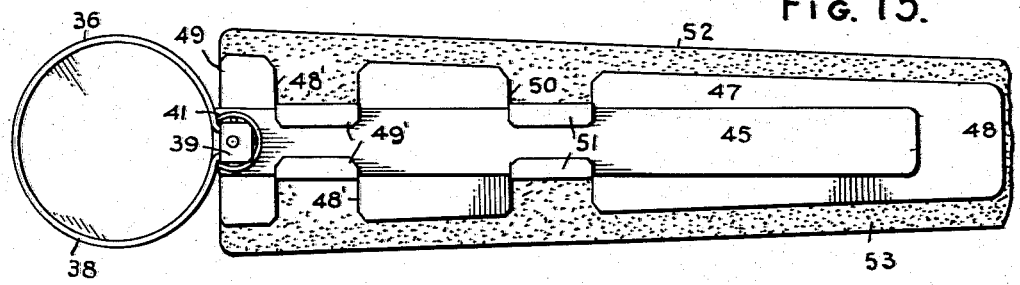
Fig. 15 is a similar view with the protective cover removed.
Figure 16:
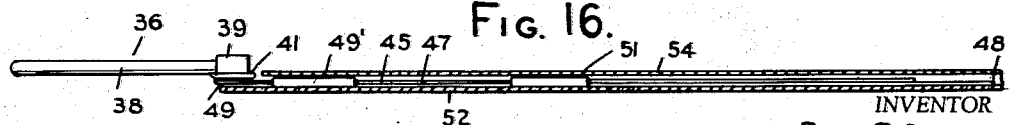
Fig. 16 is a longitudinal sectional view on the line 16—16 of Fig. 14 with the magnifier in elevation.

The preferred form of the invention shown in Figs. 1 to 16 inclusive comprises a magnifier 35 which may be of rectangular formation, as shown in Figs. 1 and 13, or of circular formation, as at 36, in Figs. 14 to 16 inclusive.

In the magnifier shown in Figs. 1 and 13 a rectangular shaped frame 37 is provided and in Figs. 14 to 16 a circular shaped frame 38 is provided.

Except for the difference in the shape of the magnifier, this form is identical in all other details and the description of the elements of one will apply to the description of the elements for the other.

The frame for the magnifier is connected to a nut 39 which in turn is secured to a clamping washer 40. The washer 40 has an upstanding peripheral flange 41 and formed in the washer inwardly of the flange is a circular row of depressions 42 which are in equally spaced relation to each other.

A central opening 43 in the washer 40 permits the passage therethrough of a screw 44 so that it may have threaded engagement with the nut 39. The screw passing through the opening 44' of a support 45 for the magnifier connects such support to the magnifier as shown in the figures.

The support 45 is made of a flexible strip of metal or similar material and positioned at the end of the support having the opening 44 therein is a pair of protuberances 46 which are arranged on opposite sides of the opening 44' in diametrical opposed relation to each other. As shown in Fig. 9 the protuberances 46 are received within the depressions 42. The adjustment of the washer 40 with relation to the support 45 is obtained by moving the frame 37 until two opposed depressions register with the protuberances 42 at which time the screw 44 is tightened and the frame and support are retained in adjusted relation to each other.

A keeper 47 is provided for the support 45 and comprises a strip of metal or similar material as shown in Figs. 14 and 15. The keeper tapers outwardly from its innermost end 48 to its outermost end 49.

The keeper 47 is severed along the lines 48' at opposite sides thereof and the portions 49' inwardly of the lines 48' are bent over upon the keeper 47 to slidably receive the support 45.

Severance lines 50 are also provided and the portions 51 are likewise bent over upon the keeper 47 to slidably receive the support 45.

A tapered strip of material 52 has an adhesive 53 on one face thereof and by reason of this adhesive the keeper 47 is secured to the inner surface of the case 30 adjacent the open end thereof.

The form previously described is sold as a unit and a protective cover 54 for the adhesive is provided, as shown in Fig. 14.

The slide rule 55 carried in the case 30 is of conventional design and is shown in Patents 2,170,144 and 2,285,722, and since it forms no part of the invention, it is believed that it is not necessary to go into detailed description thereof.

In use the cover 54 is removed and the strip of material 52 is secured by reason of the adhesive 53 to the inner surface of the case 30. The support 45 is then inserted into the portions 49 and 51 respectively.

The magnifier may be used as shown in Fig. 13 and the case 30 acting as a counterbalance when the additional weight of the keeper is added thereto, will retain the magnifier in the position shown so that the slide rule 55 may be placed under the magnifier for the enlargement of the indicia thereon.

In the modification of the invention shown in Figs. 17 and 18 a case 60 is provided for a slide rule 61 and this slide rule is also of conventional design, but is of smaller size than the slide rule 55. The case 60 is provided with a longitudinally extending pocket 62 to receive one end of a U-shaped clip 63. This clip is used to engage the edge of the pocket of a garment so that the case can be carried in the pocket.

In this instance a circular magnifier 64 is provided with a circular frame 65. A support 66 made of a strip of semi-flexible material is used to support the magnifier. At the end of the support to which the magnifier is attached a pair of oppositely extending arcuate shaped arms 67 and 68 are formed integral with the support. The arms 67 and 68 conform to the contour of the frame 65 and are secured to the frame in any well known manner.

Secured in any well known manner to the case 60, outwardly of the bent portion of the clip 63 and adjacent the open mouth of the case 62 is an auxiliary case 69.

In the use of this modification of the invention, the support 66 is slid into the pocket 62 inwardly of the clip 63. The magnifier will therefore, when in use, extend outwardly of the case 60 as shown in full in Figs. 17 and 18. When not in use, the magnifier is moved inwardly causing the support 66 to move further into the pocket 62 and such movement will be continued until the magnifier is housed in the case 67, as shown in dotted lines in Fig. 17.

The case 60 will counterbalance the magnifier 64 in the same manner as does the case 30 counterbalance the magnifier 35. Thus the magnifier 64 can also be used to magnify the indicia on the slide rule without the necessity of holding the magnifier in one hand while using the slide rule.

In the modification of the invention shown in Fig. 19, an auxiliary case 70 is provided that may be secured to a case similar to the case 30. The case 70 in this instance is made of metal or some similar material. The case 70 comprises a bottom 71 having upstanding side and end walls 72 and 73 respectively.

Hinged to the upper edge of one of the end walls 73 is a cover 74 and the cover has a depending spring tongue 74' which engages the end wall opposite to the wall on which the cover is hinged. The spring tongue serving to retain the cover in closed position.

The inner surface of the cover 74 and the inner surface of the bottom 71 has a piece of cushioning material 75 secured thereto and this material serves to prevent breakage of the magnifier 76 when it is positioned within the case 70, as shown in dotted lines in Fig. 19.

The magnifier 76 is of circular formation and is provided with a circular shaped frame 77. The ends of the frame are flattened and bent at an angle to the frame, as shown at 78. The ends are provided with apertures to receive a screw 79 whereby the frame is attached to the inner surface of the cover. As shown, the ends 78 of the frame engage the surface of the cushioning material 75.

In use the magnifier extends outwardly of the cover 74, as shown in full in Fig. 19, and when not in use the cover will be closed and the magnifier will assume the position shown in dotted lines in the same figure.

When the case 70 is attached to a case for a slide rule the magnifier will be counterbalanced, as previously described, to enable the indicia to be magnified without holding the magnifier in one hand while attempting to use the slide rule with the other hand.

In the modification of the invention, shown in Fig. 20, an auxiliary case 80 is provided. The case 80 has a top 81, an end wall 82 and side walls 83. Inwardly directed flanges 84 are provided on the longitudinal edges of the side walls and being in parallel relation to the top 81 serve as means for securing the case 80 to a case for a slide rule in any approved manner.

The case 80 is made of metal or any other suitable material which may receive and protect a magnifier 85.

The magnifier 85 is of circular formation and is provided with a circular frame 86 to which is attached a nut 87. The nut 87 being secured to one end of the supporting strip 88 by a screw 89 so that the frame can move in a complete circle with the screw 89 as the center of rotation.

The other end of the strip 88 is connected by a pivot pin 89 to one of the ends of the links 90 and 91 while the other ends of the links 90 and 91 are connected to one of the ends of the links 92 and 93 by pivot pins 94. The opposite ends of the links 92 and 93 being pivoted at 95 to the case 80 provide a lazy tongs assembly.

Thus by pulling outwardly on the magnifier 85 the lazy tongs assembly is caused to function and a guide strip 96 secured to the top 81 guides the movement of the strip 88.

Thus in the operation of the modification of the invention, the magnifier is shown in extended position by full lines and in retracted position by dotted lines.

The magnifier is extended to magnify the indicia on the slide rule and is then rotated on its pivot and pushed into the housing 80 when not in use. The front edge of the top 81 is provided with an arcuate cutout 97 so that the nut and outer end of the strip 88 may be more readily gripped to pull the magnifier out of the case 80.

The case on which the case 80 is mounted will function in similar manner to the case used in conjunction with the forms of the invention previously described.

In the modification of the invention shown in Fig. 21, an auxiliary case 100 is provided and the case 100 comprises a top 101 having a straight end 102 and a curved end 103, a wall 104 extends around the sides and curved end 103 of the top 101, but the straight end 102 is left open. A tab 105 is provided at the central portion of the curved end 103 and tabs 106 and 107 respectively are formed on the ends of the wall at the straight edge of the top. The tabs 105, 106 and 107 serve as means whereby the case 100 is mounted on the case for a slide rule in any approved manner.

Inwardly of the tabs 106 and 107 guide tabs 108 and 109 are provided on the wall 104 and these guide tabs are bent downwardly to a position parallel to the inner surface of the wall 104 to slidably receive the spring arms 110 and 111 respectively. The outer ends of the spring arms 110 and 111 are secured to the periphery of the circular frame 112. The ends of the arms being secured to the frame 112 in diametrically opposed relation to each other.

Mounted in the frame 112 is a circular magnifier 113. The arms 110 and 111 slide in the guide tabs 108 and 109 so that the magnifier may be moved to the extended position for use as shown in full in Fig. 21 or the magnifier 113 may be moved into the case 100, as shown by dotted lines in the same figure.

The inner ends of the arms 110 and 111 are extended inwardly at right angles to the arms to provide stops 114 and 115 respectively. The stops serving to limit the outward movement of the magnifier. A strip of cushioning material 116 is secured to the inner surface of the top to cushion the magnifier when in the position shown by dotted lines.

The operation of the form of the invention is similar to the operation of the forms previously described and when in the position shown in full in Fig. 21 the magnifier will be in position to magnify the indicia on a slide rule. As previously described, the case for the slide rule to which the case 100 is attached acting as a counterbalance for the magnifier when in use.

In the last modification of the invention, as shown in Figs. 22 to 29 inclusive, an auxiliary case 120 is shown and comprises a top 121, a bottom 122, side walls 123 and an end wall 124. The bottom 122 being secured to a case 125 for a slide rule in any approved manner. A male member 146 being mounted on the outer surface of the top 121 of the case 120 so that it may be engaged with a female fastener on the flap, not shown, of the case 125.

A U-shaped frame 126 having an end wall 127, side walls 128 and a top 129 is positioned within the casing 120 and is rigidly fixed thereto in any approved manner.

Each of the side walls 128 of the frame 126 is provided with a longitudinally extending guide slot 130 in which is mounted a U-shaped trackway 131. The inner ends of the trackway 131 being secured to its corresponding side wall 128 by a screw 132. Each trackway 131 is provided with a longitudinally extending slot 133 to slidably receive a fastening means 134.

Pivotally connected to each of the fastening means 134 by means of the slot 135 is a supporting arm 136. The outer ends of the arms 136 being joined in spaced relation to each other by means of a cross member 137.

Journalled in the outer ends of the arms 136 in parallel relation to the cross member 137 in a pivot pin 138. A rectangular shaped frame 139 for a rectangular shaped magnifier 140 being pivotally mounted at 141 on the pin 138.

In the use of this form of the invention the magnifier is extended outwardly of the case 120 to assume the position shown in Fig. 23. Slots 142 in the top 121 permits the angular positioning of the arms 136 as shown. The frame 139 engaging the cross member 137 retains the magnifier in parallel relation to a surface on which the case 125 is positioned thus locating the magnifier so that the indicia on a slide rule positioned below the magnifier may be magnified.

It will be obvious that the fastening means 134 will slide within the guide slots 133 as the magnifier is moved into and out of the case 120.

If the magnifier is moved to the right from the position shown in Fig. 22 and if the arms 136 are simultaneously moved downwardly the magnifier will be received within the arms 136 so that it can be easily slid into the case 120.

This form of the invention is similar in all respects to the previously described forms in that the case 125 will counterbalance the magnifier when it is in the position shown in Fig. 23.

There has thus been provided several forms of auxiliary cases for magnifiers that are adapted to be used in conjunction or cooperation with a case for a slide rule.

It is believed that the foregoing description when taken in connection with the drawings will fully set forth the construction and advantages as well as the operation of the various forms of the invention to those skilled in the art and it is to be understood that while several forms of the invention have been set forth that certain modifications thereof may be made without departing from the spirit of the invention and the scope of the annexed claims.

Having described the invention what is claimed as new and desired to be secured by Letters Patent is:

1. An auxiliary device for mounting in a slide rule case, comprising a magnifier, an elongate member secured at one end to said magnifier, a support plate having means on one side thereof forming a slide-way for said member, an adhesive sheet backing said plate on the side opposite said slide-way means and extending beyond the edges of the plate for adherence to the wall of the slide rule case, and a layer of protective material overlying the exposed edges of said adhesive sheet.

2. The auxiliary device as defined in and by claim 1 wherein opposite side edge portions of said plate are bent over upon the plate for final disposition in spaced parallelism therewith to form said slide-way means.

References Cited in the file of this patent
UNITED STATES PATENTS

| | | |
|---|---|---|
| 996,039 | Keuffel | June 20, 1911 |
| 1,557,605 | O'Meara | Oct. 20, 1925 |
| 1,782,024 | Aronson | Nov. 18, 1930 |
| 1,794,419 | Richter | Mar. 3, 1931 |
| 1,884,968 | Bloch | Oct. 25, 1932 |
| 1,900,930 | Hauser | Mar. 14, 1933 |
| 2,100,239 | Carlton | Nov. 23, 1937 |
| 2,297,232 | Martin et al. | Sept. 29, 1942 |
| 2,649,838 | Krause et al. | Aug. 25, 1953 |